US012790470B2

(12) United States Patent
Sonnycalb et al.

(10) Patent No.: US 12,790,470 B2
(45) Date of Patent: Nov. 10, 2026

(54) BLEND OF LDPE AND POST-CONSUMER RECYCLATE CONTENT WITH REDUCED FILM DEFECTS

(71) Applicant: EQUISTAR CHEMICALS, LP, Houston, TX (US)

(72) Inventors: Matthew A. Sonnycalb, Lebanon, OH (US); D. Ryan Breese, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 526 days.

(21) Appl. No.: 18/543,337

(22) Filed: Dec. 18, 2023

(65) Prior Publication Data

US 2024/0209194 A1 Jun. 27, 2024

Related U.S. Application Data

(60) Provisional application No. 63/434,178, filed on Dec. 21, 2022.

(51) Int. Cl.

| | |
|---|---|
| ***C08L 23/06*** | (2006.01) |
| ***B29C 48/00*** | (2019.01) |
| ***B29C 48/08*** | (2019.01) |
| ***B29C 48/40*** | (2019.01) |
| *B29K 23/00* | (2006.01) |
| *B29L 7/00* | (2006.01) |

(52) U.S. Cl.

CPC ............ *C08L 23/06* (2013.01); *B29C 48/022* (2019.02); *B29C 48/08* (2019.02); *B29C 48/40* (2019.02); *B29C 2948/92047* (2019.02); *B29C 2948/92209* (2019.02); *B29K 2023/0633* (2013.01); *B29L 2007/008* (2013.01); *C08L 2205/025* (2013.01); *C08L 2207/066* (2013.01)

(58) Field of Classification Search

CPC ................. C08L 23/06; C08L 2207/20; C08L 2205/025; C08L 2205/05; C08L 2207/066

See application file for complete search history.

(56) References Cited

U.S. PATENT DOCUMENTS 7,393,916 B2 7/2008 Neubauer et al.
7,608,327 B2 10/2009 Mavridis (Continued)

FOREIGN PATENT DOCUMENTS

EP 3406666 B1 9/2020
EP 3800284 A1 * 4/2021 ........... D06N 7/0065

(Continued)

OTHER PUBLICATIONS

Aji, Journal of Applied Polymer Science, vol. 88, 3070-3077 (2003) (Year: 2003).*

(Continued)

*Primary Examiner* — Robert C Boyle

(57) ABSTRACT

A polymer blend of virgin LDPE and 25 wt. % to 65 wt. % of a post-consumer recyclate (PCR) LDPE is described. By using virgin LDPE having appropriate melt index, Eta025 and Eta100 and PCR LDPE having appropriate melt index, Eta025 and Eta100, a blend is produced that can be used to form films having a low amount of gel defects and other improved properties. Methods for producing the polymer blend, and for producing films having low amounts of gel defects, are also disclosed.

20 Claims, 4 Drawing Sheets

(56) References Cited

U.S. PATENT DOCUMENTS

| | | | | |
|---|---|---|---|---|
| 7,816,478 | B2 | 10/2010 | Etherton et al. | |
| 8,034,461 | B2 | 10/2011 | Breese et al. | |
| 8,053,085 | B2 | 11/2011 | Shelley et al. | |
| 8,436,085 | B2 | 5/2013 | Borke et al. | |
| 8,664,337 | B2 | 3/2014 | Mazzola et al. | |
| 10,889,666 | B2 | 1/2021 | Ruemer et al. | |
| 2011/0160403 | A1 | 6/2011 | Mavridis | |
| 2018/0230250 | A1* | 8/2018 | Botros | B29C 48/08 |
| 2020/0122445 | A1 | 4/2020 | Corcoran et al. | |
| 2022/0281150 | A1 | 9/2022 | Carbonell et al. | |

FOREIGN PATENT DOCUMENTS

| | | | | |
|---|---|---|---|---|
| WO | WO-2020223019 | A1 * | 11/2020 | C08L 23/06 |
| WO | WO-2020229932 | A1 * | 11/2020 | C08L 23/06 |
| WO | 2021122299 | A1 | 6/2021 | |
| WO | 2023057554 | A1 | 4/2023 | |

OTHER PUBLICATIONS

The International Search Report and The Written Opinion for PCT/US2023/084583 mailed Apr. 25, 2024.

* cited by examiner

| | Dry Blend Average Result | 18mm (no screenpack) | 26mm high shear screw (200 mesh screenpack) | 40mm general purpose screw (325 mesh screenpack) |
|---|---|---|---|---|
| >1500 micron | 0.3 | 8.0 | 0.3 | 0.3 |
| 1000-1500 micron | 3.8 | 60.3 | 6.0 | 6.3 |
| 500-1000 micron | 678 | 930 | 236 | 287 |
| 250-500 micron | 17869 | 9833 | 7616 | 6672 |

250-500 micron 500-1000 micron 1000-1500 micron >1500 micron

BLEND OF LDPE AND POST-CONSUMER RECYCLATE CONTENT WITH REDUCED FILM DEFECTS

PRIOR RELATED APPLICATIONS

This application claims the benefit of priority to U.S. Provisional Application No. 63/434,178, filed on Dec. 21, 2022, which is incorporated herein by reference in its entirety.

FIELD OF THE INVENTION

The present disclosure relates to polymer blend compositions containing a large proportion of post-consumer recyclate (PCR).

BACKGROUND OF THE INVENTION

In an era when "circularity" of material processing is gaining importance, there has been a significant effort to develop 'single-pellet' polyethylene grades based on compounded blends of post-consumer recycled polyethylene ("post-consumer recyclate polyethylene", PCR-PE) and virgin polyethylene. One desired application area for the compounded blends is in production of films, e.g. for use in flexible packaging, as blown or extruded films.

Compositions for many film formulations include low density polyethylene (LDPE) to provide improved processing characteristics in the film blowing or extruding process. Due to the relatively low thickness of film, defects known as gels can result in processability issues in the blown film process and/or aesthetic issues in the final packaging. As a result, one of the desired characteristics of any single-pellet PCR-PE blend is to provide a low amount of gels in films prepared from the pelleted blend.

This disclosure provides a blend of virgin LDPE and post-consumer recycled LDPE that shows a reduced level of film defects when used to prepare the films.

SUMMARY OF THE INVENTION

The present disclosure provides polymer blends comprising a large proportion of post-consumer recyclate polymer that can be used to prepare, inter alia, films having low amount of gel defects. Also disclosed herein are methods for preparing the polymer blends and methods for making a film product.

Thus, in one aspect, the present disclosure provides a polymer blend comprising:

a) a virgin low density polyethylene (LDPE) component in an amount of from 35 wt. % to 75 wt. %, the virgin LDPE component having:
   (i) a Melt Index at 2.16 kg (MI2) by ASTM D1238 of from 0.15-2.5 g/10 min;
   (ii) an Eta025 of from $0.25\times10^6$ to $2.3\times10^6$ poise at 150° C.;
   (iii) an Eta100 of from $0.7\times10^4$ to $1.7\times10^4$ poise at 150° C.; and b) a post-consumer low density polyethylene recyclate (PCR-LDPE) component in an amount from 25 wt. % to 65 wt. % of the total weight of the blend, the PCR component having:
   (i) a MI2 by ASTM D1238 of from 0.5-3.0 g/10 min;
   (ii) an Eta025 of from $2.5\times10^5$ to $8.0\times10^5$ poise at 150° C.;

(iii) an Eta100 of from $1.6\times10^4$ to $3.0\times10^4$ poise at 150° C.;

wherein weight percentages of the virgin LDPE and PCR-LDPE components are based on the total weight of the virgin LDPE and the PCR-LDPE components.

In another aspect, the disclosure provides a method for reducing gel defects in a polymer film product comprising:

a) blending a virgin low density polyethylene (LDPE) component in an amount of from 35 wt. % to 75 wt. %, the virgin LDPE component having:
   (i) a MI2 by ASTM D1238 of from 0.2-2.5 g/10 min;
   (ii) an Eta025 of from $0.7\times10^6$ to $2.3\times10^6$ poise at 150° C.;
   (iii) an Eta100 of from $0.9\times10^4$ to $1.50\times10^4$ poise at 150° C.; and a post-consumer recyclate LDPE (PCR-LDPE) component in an amount from 25 wt. % to 65 wt. %, the PCR-LDPE component having:
   (i) a MI2 by ASTM D1238 of from 0.5-1.5 g/10 min;
   (ii) an Eta025 of from $2.5\times10^5$ to $8.0\times10^5$ poise at 150° C.;
   (iii) an Eta100 of from $1.6\times10^4$ to $3.0\times10^4$ poise at 150° C.;

wherein weight percentages of the virgin LDPE and PCR-LDPE components are based on the total weight of the virgin LDPE and the PCR-LDPE components;

to obtain a film resin; and b) forming a film from the film resin by a film extrusion or film blowing process.

The disclosure also provides as film prepared using the methods disclosed herein.

The disclosure provides as well a method for preparing a solid polymer blend comprising:

a) adding a virgin LDPE component and a PCR-LDPE component to an extruder;
b) mixing the virgin LDPE and PCR-LDPE under compounding conditions to form a polymer blend product; and
c) withdrawing the polymer blend product from the extruder.

BRIEF DESCRIPTION OF THE DRAWINGS

The presently disclosed composition and methods of making and using such will now be described in more detail with reference to working examples of the invention, given only by way of example, and with reference to the accompanying drawings, in which.

DETAILED DESCRIPTION OF THE INVENTION

Figure 1:
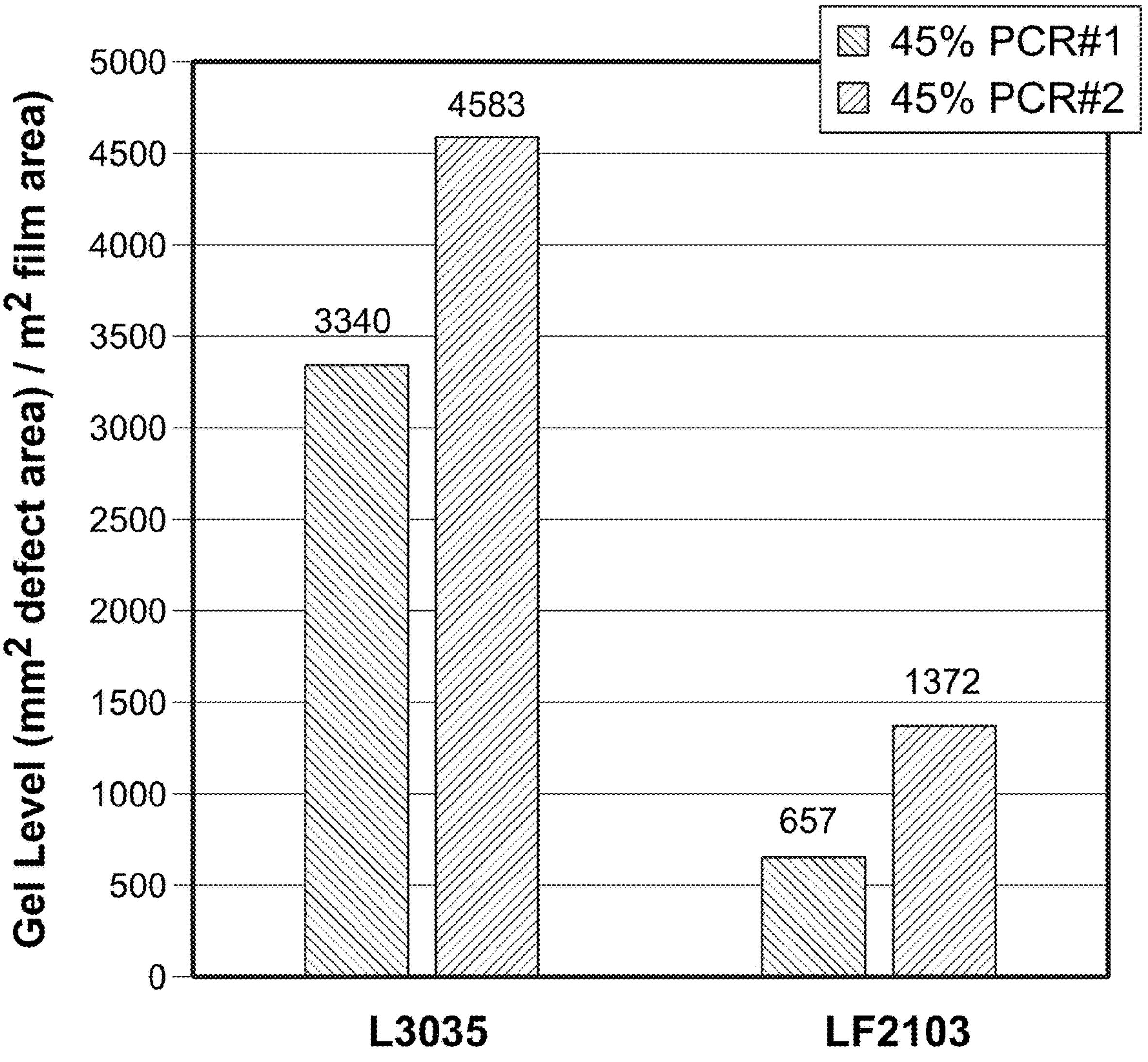
FIG. 1 shows the number of defects per $m^2$ for different blends of virgin LDPE and PCR-PE. L3035 and LF2103 are virgin LDPE resins having properties shown in Table 1. PCR #1 (produced by Circulus) and PCR #2 (produced by Avangard Innovative) are post-consumer recyclate LDPEs containing significant amount of LLDPE and having properties shown in Table 1.

Illustrative embodiments of the subject matter claimed below will now be disclosed. It will be appreciated that in the development of any actual embodiments, numerous implementation-specific decisions can be made to achieve the developer's specific goals, which will vary from one implementation to another. Moreover, it will be appreciated that such a development effort, even if complex and time-consuming, would be expected by and achievable by of ordinary skill in the art provided the benefit and guidance of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase. It must also be noted that, as used in the specification and the appended claims, the singular forms "a," "an," and "the" include plural references unless otherwise specified.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

Definitions

"Antioxidant agents," as used herein, means compounds that inhibit oxidation, a chemical reaction that can produce free radicals and chain reactions. Antioxidants are differentiated based on their reaction mechanisms and include: (1) primary antioxidants, and (2) secondary antioxidants.

"Compounding conditions," as used herein, means temperature, pressure, and shear force conditions implemented in an extruder to provide intimate mixing of two or more polymers and optionally additives to produce a substantially homogeneous polymer product.

"LDPE recyclate" or "PCR LDPE", as used herein, means a polyolefin recyclate composed of LDPE, but which can have a proportion, even a majority, of LLDPE. "LDPE recyclate" can also contain HDPE. In general, "LDPE recyclate" will have a density of from 0.900 g/cm$^3$ to 0.960 g/cm$^3$, e.g. in the range of 0.900 to 0.940 or from 0.900 to 0.945 or to 0.950.

"LDPE," as used herein, means ethylene homopolymers and ethylene copolymers, typically produced in a high pressure process via free-radical polymerization and having a density in the range of 0.900 g/cm$^3$ to 0.934 g/cm$^3$. The density of "LDPE recyclate" or "PCR-LDPE" can be higher than 0.934 g/cm$^3$ due to inclusion of other polymers, such as HDPE.

"Polyolefin recyclate," as used herein, means post-consumer recycled ("PCR") polyolefin and/or post-industrial recycled ("PIR") polyolefin. Polyolefin recyclate is derived from an end product that has completed its life cycle as a consumer item and would otherwise be disposed of as waste (e.g., a polyethylene water bottle) or from plastic scrap that is generated as waste from an industrial process. Post-consumer polyolefins include polyolefins that have been collected in commercial and residential recycling programs, including flexible packaging (cast film, blown film and BOPP film), rigid packaging, blow molded bottles, and injection molded containers. Through a step of separation from other polymers, such as PVC, PET or PS, two main polyolefinic fractions are obtained, namely polyethylene recyclate (including HDPE, MDPE, LDPE, and LLDPE) and polypropylene recyclate (including homopolymers, random copolymers, and heterophasic copolymers). Polyethylene recyclate can be further separated to recover a portion having polyolefin as the primary constituent. In addition to contamination from dissimilar polymers, polyolefin recyclate can contain other impurities such as calcium carbonate, diatomaceous earth, talc, foil, etc. For purposes of this disclosure, the overall level of such impurities in a PCR polyethylene is characterized by the "ash content" of the material. Though not the primary determinant of gel defect content in a blend, it is preferable that the PCR-LDPE have lower ash content; for example ≤3.0%, preferably ≤2.5%, ≤2.0% or ≤1.5%, as measured by, e.g. ASTM D5630-22.

There are other combustible impurities (e.g. the PMMA, PC, nylon, cellulose, etc.) that are contained in the recyclate that can contribute significantly to gel defect (and others) levels. Thus, it is preferable that amounts of these contaminants in the PCR-LDPE be minimized.

"Primary antioxidants," as used herein, means compounds which function essentially as free radical terminators or scavengers. Primary antioxidants react rapidly with peroxy and alkoxy radicals. The majority of primary antioxidants for polymers are sterically hindered phenols.

"Processability," as used herein, refers to how well a polymer composition can be formed into a cast of blown film of commercial quality or molded by injection or compression molding into a molded article of commercial quality at commercially acceptable rates using the equipment and conditions.

"Secondary antioxidants," as used herein, means compounds which are preventive antioxidants that function by retarding chain initiation. Secondary antioxidants react with hydroperoxides to yield non-radical products and are, therefore, called hydroperoxide decomposers.

"Virgin LDPE," as used herein, is pre-consumer LDPE. Pre-consumer LDPEs are products obtained directly or indirectly from petrochemical feedstocks fed to a polymerization apparatus. Pre-consumer polyolefins can be subjected to post polymerization processes such as, but not limited to, extrusion, pelletization, visbreaking, and/or other processing completed before the product reaches the end-use consumer. In some embodiments, virgin polyolefins have a single heat history. In some embodiments, virgin polyolefins have more than one heat history. In some embodiments, virgin polyolefins comprise no additives. In some embodiments, virgin polyolefins comprise additives.

"MI2" is the "melt index" determined at 2.16 kg by ASTM D1238.

"Eta025" is the complex viscosity determined at a frequency of 0.025 rad/s, measured at 150° C.

"Eta100" is the complex viscosity determined at a frequency of 100 rad/s, measured at 150° C.

The ratio of Eta025 to Eta100 is a measure of sensitivity of viscosity to shear force, wherein a lower ratio indicates lower sensitivity. The virgin LDPE used in accord with this disclosure will have a ratio of Eta025 to Eta 100 of from 15 to 150, more typically toward the higher end of the range. The PCR-LDPE used can have a similar range of this ratio, but is typically at the lower end of the range, e.g. from 15 to 100, or from 15 to 50, or from 15 to 30.

"RDR" is the Rheological Dispersity Ratio, as described in "New Measures of Polydispersity from Rheological Data on Polymer Melts.", R. Shroff and H. Mavirdis, J. Appl. Polymer Sci., 57:1605-1626 (1995, see esp. p. 1618); hereby incorporated by reference in its entirety and for all purposes. For purposes of this disclosure, values of RDR are determined at a fixed product of A×B (A and B being the constant and the exponent, respectively, in the Sabia equation) of 0.72, the polymers disclosed herein generally being polyolefins.

Density is measured in accordance with ASTM D1505.

"Film stiffness" or "film modulus" is measured in accordance with ASTM D882 (1% secant modulus).

Machine-direction tear strength (TSMD) and transverse-direction tear strength (TSTD) are measured in accordance with ASTM D1922.

"Dart drop impact strength," is the impact resistance of plastic film as measured by ASTM D1709, Method A. A dart is dropped from a height of 66 cm and the impact resistance is derived from the mass of the dart required to break 50% of a large number of specimens.

"Modulus" means the 1% secant tensile modulus of plastic film measured by ASTM D882-02.

"Tear strength" means the propagation tear resistance of plastic films measured by ASTM D1922-03a. This test is sometimes called the Elmendorf tear test. The tear strength measured along the machine direction of the film is the MD tear strength. Likewise, the tear strength measured perpendicular to the machine direction is the TD tear strength.

In this specification, the term "film" shall mean a single layer or multiple layers of polymer blends, each layer having a thickness of from about 0.1 to about 10 mils. The films can be of any type prepared by processes well known to those skilled in the art, such as cast, blown-air, blown-water, oriented, and biaxially oriented. The films may also be used in extrusion coating and extrusion lamination processes. When the films are coextruded, they can be produced using conventional methods and extrusion equipment well known to those skilled in the art, where layers of polymer melts are combined by introducing multiple polymer melt streams into a combining block/manifold or die which then directs the melt streams to flow together (while still in the block/manifold or die), then exiting the die together as a single flow stream. Alternately, multiple polymer melt streams can be introduced into a die and then combined just after exiting the die. Film blowing processes are described in, for example, U.S. Pat. No. 7,816,478 (and coupled to resin production), and resin production and additional film production processes are described in (among others) US Patents and US Patent Publications U.S. Pat. Nos. 8,034,461, 7,393,916, US Publ. 20200122445 (especially of multilayer films), US Publ. 20180230250, U.S. Pat. No. 8,436,085 (using HDPE resins), U.S. Pat. No. 8,053,085 (especially of multilayer blown films), US Publ. 20110160403 and U.S.

Pat. No. 7,608,327; all hereby incorporated by reference in their entirety and for all purposes.

A polymer blend as disclosed herein can be one comprising:

a) a virgin low density polyethylene (LDPE) component in an amount of from 35 wt. % to 75 wt. %, or from 40 wt. % to 75 wt. %, or from 50 wt. % to 75 wt. %, or from 55 wt. % to 75 wt. % the virgin LDPE component having:
   - (i) a Melt Index at 2.16 kg (MI2) by ASTM D1238 of from 0.15-2.5 g/10 min, or from 0.2-2.2 g/10 min, or from 0.3-2.0 g/10 min, or from 0.2-1.5 g/10 min, or from 0.3-1.5 g/10 min;
   - (ii) an Eta025 of from $0.25\times10^6$ to $2.3\times10^6$ poise at 150° C., or from $0.25\times10^6$ to $2.0\times10^6$ poise at 150° C., or from $0.25\times10^6$ to $1.8\times10^6$ poise at 150° C., or from $0.25\times10^6$ to $1.5\times10^6$ poise at 150° C., or from $0.3\times10^6$ to $1.8\times10^6$ poise at 150° C., or from $0.3\times10^6$ to $1.5\times10^6$ poise at 150 C, or from $0.4\times10^6$ to $1.5\times10^6$ poise at 150° C.;
   - (iii) an Eta100 of from $0.7\times10^4$ to $1.7\times10^4$ poise at 150° C., or of from $0.8\times10^4$ to $1.60\times10^4$ poise at 150° C., or of from $0.8\times10^4$ to $1.50\times10^4$ poise at 150° C., or of from $0.9\times10^4$ to $1.50\times10^4$ poise at 150° C.; and b) a post-consumer low density polyethylene recyclate (PCR-LDPE) component in an amount from 25 wt. % to 65 wt. %, or from 25 wt. % to 60 wt. %, or from 25 wt. % to 50 wt. %, or from 25 wt. % to 55 wt. %, or from 45 wt. % to 65 wt. % of the total weight of the blend, the PCR component having:
   - (i) a MI2 by ASTM D1238 of 0.5-3.0 g/10 min, or of 0.5-2.5 g/10 min or of 0.5-2.0 g/10 min of 0.5-1.5 g/10 min;
   - (ii) an Eta025 of from $2.5\times10^5$ to $8.0\times10^5$ poise at 150° C., or from $3.0\times10^5$ to $8.0\times10^5$ poise at 150° C., or from $3.5\times10^5$ to $7.0\times10^5$ poise at 150° C., or from $3.0\times10^5$ to $6.0\times10^5$ poise at 150° C., or from $3.0\times10^5$ to $4.0\times10^5$ poise at 150° C., or from $2.5\times10^5$ to $4.0\times10^5$ poise at 150° C.;
   - (iii) an Eta100 of from $1.6\times10^4$ to $3.0\times10^4$ poise at 150° C., or from $1.6\times10^4$ to $2.8\times10^4$ poise at 150° C., or from $1.6\times10^4$ to $2.7\times10^4$ poise at 150° C., or from $1.6\times10^4$ to $2.6\times10^4$ poise at 150° C.;

wherein weight percentages of the virgin LDPE and PCR-LDPE components are based on the total weight of the virgin LDPE and the PCR-LDPE components.

Such a polymer blend can be one wherein the virgin LDPE component has a Rheological Dispersity Ratio (RDR) of from 10 to 25, or from 12 to 25, or from 15 to 25.

Additionally, or alternatively, such a polymer blend can be one wherein the PCR-LDPE component has a RDR of from 1.00 to 2.50, or from 1.00 to 2.00, or from 1.00 to 1.8.

A polymer blend as described above can be one wherein the density of the virgin LDPE component is from 0.900 to 0.934 g/cm$^3$, or from 0.920 to 0.934 g/cm$^3$, or from 0.925 to 0.934 g/cm$^3$.

A polymer blend having some or all of the features above can be one wherein the density of the PCR-LDPE component is from 0.910 to 0.960 g/cm$^3$, or from 0.920 to 0.960 g/cm$^3$, or from 0.925 to 0.960 g/cm$^3$, or from 0.920 to 0.950 g/cm$^3$, or from 0.920 to 0.940 g/cm$^3$.

A polymer blend having some or all of the features above can be one wherein the virgin LDPE has a ratio of Eta025 to Eta100 of from 15 to 150, or from 25 to 150, or from 30 to 150, or from 50 to 150, or from 70 to 150, or from 75 to 150, or from 70 to 120.

A polymer blend having some or all of the features above can be one that is compounded in a twin-screw extruder with a specific energy input from 0.02 to 0.26 kW-hr/lb (0.044 to 0.57 kW-hr/kg), or from 0.04 to 0.26 kW-hr/lb (0.088 to 0.57 kW-hr/kg), or from 0.06 to 0.26 kW-hr/lb (0.132 to 0.57 kW-hr/kg), or from 0.08 to 0.26 kW-hr/lb (0.176 to 0.57 kW-hr/kg), or from 0.10 to 0.26 kW-hr/lb (0.22 to 0.57 kW-hr/kg). The extruder can be operated to provide a melt temperature of from 370° F.). (188° C. to 460° F. (238° C.), or from 380° F. (193° C.) to 460° F. (238° C.), or from 390° F. (199° C.) to 460° F. (238° C.), or from 400° F.). (204° C. to 460° F. (238° C.), or from 400° F. (204° C.) to 450° F.). (232° C., or from 370° F. (188° C.) to 430° F.) (221° C.)

In some instances, the twin-screw extruder can include a screenpack at the outlet of the extruder.

A polymer film can comprise the polymer blend described above. Such a polymer film can be one having a level of gel defects of ≤1600 $mm^2/m^2$, or one having a level of gel defects of ≤660 $mm^2/m^2$. Generally, a polymer film as disclosed herein can have a level of gel defects of about 10 $mm^2/m^2$ up to 1600 $mm^2/m^2$, or of about 10 $mm^2/m^2$ up to 1000 $mm^2/m^2$, or of about 10 $mm^2/m^2$ up to 700 $mm^2/m^2$, or of about 100 $mm^2/m^2$ up to 1600 $mm^2/m^2$, or of about 100 $mm^2/m^2$ up to 1000 $mm^2/m^2$, or of about 100 $mm^2/m^2$ up to 700 $mm^2/m^2$, or of about 500 $mm^2/m^2$ up to 1600 $mm^2/m^2$, or of about 500 $mm^2/m^2$ up to 1000 $mm^2/m^2$.

A method for reducing gel defects in a polymer film product is also disclosed. Such a method can be one comprising:

a) blending a virgin low density polyethylene (LDPE) component in an amount of from 35 wt. % to 75 wt. %, or from 40 wt. % to 75 wt. %, or from 50 wt. % to 75 wt. %, or from 55 wt. % to 75 wt. % the virgin LDPE component having:
   (i) a Melt Index at 2.16 kg (MI2) by ASTM D1238 of from 0.15-2.5 g/10 min, or from 0.2-2.2 g/10 min, or from 0.3-2.0 g/10 min, or from 0.2-1.5 g/10 min, or from 0.3-1.5 g/10 min;
   (ii) an Eta025 of from $0.25\times10^6$ to $2.3\times10^6$ poise at 150° C., or from $0.25\times10^6$ to $2.0\times10^6$ poise at 150° C., or from $0.25\times10^6$ to $1.8\times10^6$ poise at 150° C., or from $0.25\times10^6$ to $1.5\times10^6$ poise at 150° C., or from $0.3\times10^6$ to $1.8\times10^6$ poise at 150° C., or from $0.3\times10^6$ to $1.5\times10^6$ poise at 150° C., or from $0.4\times10^6$ to $1.5\times10^6$ poise at 150° C.;
   (iii) an Eta100 of from $0.7\times10^4$ to $1.7\times10^4$ poise at 150° C., or of from $0.8\times10^4$ to $1.60\times10^4$ poise at 150° C., or of from $0.8\times10^4$ to $1.50\times10^4$ poise at 150° C., or of from $0.9\times10^4$ to $1.50\times10^4$ poise at 150° C.; and a post-consumer low density polyethylene recyclate (PCR-LDPE) component in an amount from 25 wt. % to 65 wt. %, or from 25 wt. % to 60 wt. %, or from 25 wt. % to 50 wt. %, or from 25 wt. % to 55 wt. %, or from 45 wt. % to 65 wt. % of the total weight of the blend, the PCR component having:
   (i) a MI2 by ASTM D1238 of 0.5-3.0 g/10 min, or of 0.5-2.5 g/10 min or of 0.5-2.0 g/10 min of 0.5-1.5 g/10 min;
   (ii) an Eta025 of from $2.5\times10^5$ to $8.0\times10^5$ poise at 150° C., or from $3.0\times10^5$ to $8.0\times10^5$ poise at 150° C., or from $3.5\times10^5$ to $7.0\times10^5$ poise at 150° C., or from $3.0\times10^5$ to $6.0\times10^5$ poise at 150° C., or from $3.0\times10^5$ to $4.0\times10^5$ poise at 150° C., or from $2.5\times10^5$ to $4.0\times10^5$ poise at 150° C.;
   (iii) an Eta100 of from $1.6\times10^4$ to $3.0\times10^4$ poise at 150° C., or from $1.6\times10^4$ to $2.8\times10^4$ poise at 150° C., or from $1.6\times10^4$ to $2.7\times10^4$ poise at 150° C., or from $1.6\times10^4$ to $2.6\times10^4$ poise at 150° C.;

wherein weight percentages of the virgin LDPE and PCR-LDPE components are based on the total weight of the virgin LDPE and the PCR-LDPE components;

to obtain a film resin; and b) forming a film from the film resin by a film extrusion or film blowing process.

In such a method, the virgin LDPE component can have a Rheological Dispersity Ratio (RDR) of from 10 to 25, or from 12 to 25, or from 15 to 25.

Additionally or alternatively in such a method, the PCR-LDPE component can have a RDR of from 1.00 to 2.50, or from 1.00 to 2.00, or from 1.00 to 1.8.

In any implementations of the methods for reducing gel defects in a polymer film product described above, the density of the virgin LDPE component can be from 0.900 to 0.934 $g/cm^3$, or from 0.920 to 0.934 $g/cm^3$, or from 0.925 to 0.934 $g/cm^3$.

In any implementations of the methods for reducing gel defects in a polymer film product described above, the density of the PCR-LDPE component can be from 0.910 to 0.960 $g/cm^3$, or from 0.920 to 0.960 $g/cm^3$, or from 0.925 to 0.960 $g/cm^3$, or from 0.920 to 0.950 $g/cm^3$, or from 0.920 to 0.940 $g/cm^3$.

Additionally, or alternatively, in any implementations of the methods for reducing gel defects in a polymer film product described above, the virgin LDPE can have a ratio of Eta025 to Eta100 of from 15 to 150, or from 25 to 150, or from 30 to 150, or from 50 to 150, or from 70 to 150, or from 75 to 150, or from 70 to 120.

Additionally, or alternatively, in any implementations of the methods for reducing gel defects in a polymer film product described above, the PCR-LDPE component can have a RDR of from 1.00 to 2.50, or from 1.00 to 2.00, or from 1.00 to 1.8.

In any implementation of the methods for reducing gel defects in a polymer film product described herein, blending can performed in a twin-screw compounder with a specific energy input from 0.02 to 0.26 kW-hr/lb (0.044 to 0.57 kW-hr/kg), or from 0.04 to 0.26 kW-hr/lb (0.088 to 0.57 kW-hr/kg), or from 0.06 to 0.26 kW-hr/lb (0.132 to 0.57 kW-hr/kg), or from 0.08 to 0.26 kW-hr/lb (0.176 to 0.57 kW-hr/kg), or from 0.10 to 0.26 kW-hr/lb (0.22 to 0.57 kW-hr/kg). The extruder can be operated to provide a melt temperature of from 370° F. (188° C.) to 460° F. (238° C.), or from 380° F. (193° C.) to 460° F. (238° C.), or from 390° F. (199° C.) to 460° F. (238° C.), or from 400° F. (204° C.) to 460° F. (238° C.), or from 400° F. (204° C.) to 450° F.). (232° C., or from 370° F. (188° C.) to 430° F. (221° C.). Generally, use of higher melt temperature allows for use of a lower specific energy input by the extruder screw(s), and vice-versa.

Polymer films having a low level of film defects can be prepared by the method described above. A polymer film prepared by the disclosed method for reducing gel defects herein can be one having a level of gel defects of ≤1600 $mm^2/m^2$, or one having a level of gel defects of ≤660 $mm^2/m^2$. Such a polymer film can have a level of gel defects of about 10 $mm^2/m^2$ up to 1600 $mm^2/m^2$, or of about 10 $mm^2/m^2$ up to 1000 $mm^2/m^2$, or of about 10 $mm^2/m^2$ up to 700 $mm^2/m^2$, or of about 100 $mm^2/m^2$ up to 1600 $mm^2/m^2$, or of about 100 $mm^2/m^2$ up to 1000 $mm^2/m^2$, or of about 100 $mm^2/m^2$ up to 700 $mm^2/m^2$, or of about 500 $mm^2/m^2$ up to 1600 $mm^2/m^2$, or of about 500 $mm^2/m^2$ up to 1000 $mm^2/m^2$.

A polymer film having a composition as described above, or prepared by a method described above can be one having a 1% secant modulus in the machine direction of from 25,000 to 55,000 psi and in the transverse direction of from 25,000 to 55,000 psi, or of from 25,000 to 50,000 psi and in the transverse direction of from 25,000 to 50,000 psi of from 25,000 to 45,000 psi and in the transverse direction of from 25,000 to 45,000 psi; and shrink at 135° C. in the machine direction of from 60 to 85% and in the transverse direction of from 5 to 50%, or in the machine direction of from 65 to 85% and in the transverse direction of from 10 to 50%, or in the machine direction of from 70 to 85% and in the transverse direction of from 15 to 50%.

A method for preparing a solid polymer blend can comprise:

a) adding a virgin LDPE component and a PCR-LDPE component to an extruder;

b) mixing the virgin LDPE and PCR-LDPE under compounding conditions to form a polymer blend product; and c) withdrawing the polymer blend product from the extruder.

In such a method for preparing a solid polymer blend, the virgin low density polyethylene (LDPE) component can be in an amount of from 35 wt. % to 75 wt. %, or from 40 wt. % to 75 wt. %, or from 50 wt. % to 75 wt. %, or from 55 wt. % to 75 wt. % the virgin LDPE component having:

(i) a Melt Index at 2.16 kg (MI2) by ASTM D1238 of from 0.15-2.5 g/10 min, or from 0.2-2.2 g/10 min, or from 0.3-2.0 g/10 min, or from 0.2-1.5 g/10 min, or from 0.3-1.5 g/10 min;

(ii) an Eta025 of from $0.25\times10^6$ to $2.3\times10^6$ poise at 150° C., or from $0.25\times10^6$ to $2.0\times10^6$ poise at 150° C., or from $0.25\times10^6$ to $1.8\times10^6$ poise at 150° C., or from $0.25\times10^6$ to $1.5\times10^6$ poise at 150° C., or from $0.3\times10^6$ to $1.8\times10^6$ poise at 150° C., or from $0.3\times10^6$ to $1.5\times10^6$ poise at 150° C., or from $0.4\times10^6$ to $1.5\times10^6$ poise at 150° C.;

(iii) an Eta100 of from $0.7\times10^4$ to $1.7\times10^4$ poise at 150° C., or of from $0.8\times10^4$ to $1.60\times10^4$ poise at 150° C., or of from $0.8\times10^4$ to $1.50\times10^4$ poise at 150° C., or of from $0.9\times10^4$ to $1.50\times10^4$ poise at 150° C.

And, the post-consumer low density polyethylene recyclate (PCR-LDPE) component can be in an amount from 25 wt. % to 65 wt. %, or from 25 wt. % to 60 wt. %, or from 25 wt. % to 50 wt. %, or from 25 wt. % to 55 wt. %, or from 45 wt. % to 65 wt. % of the total weight of the blend, the PCR component having:

(i) a MI2 by ASTM D1238 of 0.5-3.0 g/10 min, or of 0.5-2.5 g/10 min or of 0.5-2.0 g/10 min of 0.5-1.5 g/10 min;

(ii) an Eta025 of from $2.5\times10^5$ to $8.0\times10^5$ poise at 150° C., or from $3.0\times10^5$ to $8.0\times10^5$ poise at 150° C., or from $3.5\times10^5$ to $7.0\times10^5$ poise at 150° C., or from $3.0\times10^5$ to $6.0\times10^5$ poise at 150° C., or from $3.0\times10^5$ to $4.0\times10^5$ poise at 150° C., or from $2.5\times10^5$ to $4.0\times10^5$ poise at 150° C.;

(iii) an Eta100 of from $1.6\times10^4$ to $3.0\times10^4$ poise at 150° C., or from $1.6\times10^4$ to $2.8\times10^4$ poise at 150° C., or from $1.6\times10^4$ to $2.7\times10^4$ poise at 150° C., or from $1.6\times10^4$ to $2.6\times10^4$ poise at 150° C.;

wherein weight percentages of the virgin LDPE and PCR-LDPE components are based on the total weight of the virgin LDPE and the PCR-LDPE components.

In such a method for preparing a solid polymer blend, the virgin LDPE component can have a Rheological Dispersity Ratio (RDR) of from 10 to 25, or from 12 to 25, or from 15 to 25.

Additionally, or alternatively in such a method for preparing a solid polymer blend, the PCR-LDPE component can have a RDR of from 1.00 to 2.50, or from 1.00 to 2.00, or from 1.00 to 1.8.

Additionally, or alternatively, in any implementations of the methods for preparing a solid polymer blend described above, the density of the virgin LDPE component can be from 0.900 to 0.934 g/cm$^3$, or from 0.920 to 0.934 g/cm$^3$, or from 0.925 to 0.934 g/cm$^3$.

Additionally, or alternatively, in any implementations of the methods for preparing a solid polymer blend described above, the density of the PCR-LDPE component can be from 0.910 to 0.960 g/cm$^3$, or from 0.920 to 0.960 g/cm$^3$, or from 0.925 to 0.960 g/cm$^3$, or from 0.920 to 0.950 g/cm$^3$, or from 0.920 to 0.940 g/cm$^3$.

Additionally, or alternatively, in any implementations of the methods for preparing a solid polymer blend described above, the virgin LDPE can have a ratio of Eta025 to Eta100 of from 15 to 150, or from 25 to 150, or from 30 to 150, or from 50 to 150, or from 70 to 150, or from 75 to 150, or from 75 to 120, or from 70 to 120, or from 70 to 115.

Additionally, or alternatively, in any implementations of the methods for preparing a solid polymer blend described above, the PCR-LDPE component can have a RDR of from 1.0 to 2.5, or from 1.0 to 2.0, or from 1.0 to 1.8.

In any implementations of the methods for preparing a solid polymer blend described herein, mixing (compounding) can be performed in a twin-screw compounder with a specific energy input from 0.02 to 0.26 kW-hr/lb (0.044 to 0.57 kW-hr/kg), or from 0.04 to 0.26 kW-hr/lb (0.088 to 0.57 kW-hr/kg), or from 0.06 to 0.26 kW-hr/lb (0.132 to 0.57 kW-hr/kg), or from 0.08 to 0.26 kW-hr/lb (0.176 to 0.57 kW-hr/kg), or from 0.10 to 0.26 kW-hr/lb (0.22 to 0.57 kW-hr/kg). The extruder can be operated to provide a melt temperature of from 370° F. (188° C.) to 460° F.) (238° C., or from 380° F. (193° C.) to 460° F. (238° C.), or from 390° F. (199° C.) to 460° F. (238° C.), or from 400° F. (204° C.) to 460° F. (238° C.), or from 400° F. (204° C.) to 450° F.). (232° C., or from 370° F. (188° C.) to 430° F. (221° C.). Generally, use of higher melt temperature allows for use of a lower specific energy input by the extruder screw(s), and vice-versa.

In any implementations of the methods for preparing a solid polymer blend described herein, the step of withdrawing the polymer blend product (extrudate) from the extruder can be accomplished by means generally known in the art, such as pelletizing the extrudate. Methods such as underwater pelleting or strand pelletization can be used. In strand palletization, the extrudate is formed as a strand that is cooled, typically in a water bath, and then sliced into pieces.

For forming a film product, a solid polymer blend product, e.g. as pellets, can be melted and the melt fed into a film-forming apparatus.

A virgin LDPE for use as disclosed herein can be made by processes known in the art, for example as described in US Publ. 2018/0230250, hereby incorporated by reference in its entirety and for all purposes. Virgin LDPEs useful as disclosed herein can be obtained commercially from many suppliers. Virgin LDPEs utilized in the Examples herein are commercial products of Equistar Chemicals, LP, Houston, TX, USA.

PCR-LDPE materials used in the Examples in this disclosure are mechanical recyclates sourced from 3rd parties. The sourced PCR was a blend of LDPE and other PEs. The sourced PCR-LDPE materials had 10-60 wt. % of LDPE, with the balance being primarily LLDPE. The PCR-LDPE denoted as PCR #1 herein was produced by Circulus. PCR #2 was produced by Avangard Innovative.

Material properties of various polymer resins referenced in this disclosure are set out in Table 1.

TABLE 1

| Material Data for virgin LDPE and LDPE recyclate resins | | | | | | | | |
|---|---|---|---|---|---|---|---|---|
| Resin | Grade | MI2 g/10 min | Density g/cc | Eta025 poise at 150° C. | Eta100 poise at 150° C. | Ratio E025/E100 at 150° C. | RDR | ASH CONTENT (%) |
| Virgin | NA321 | 2 | 0.922 | 2.76E+05 | 8.93E+03 | 31 | 12.7 | n/a |
| Virgin | L3035 (“Clarity”) | 0.4 | 0.929 | 1.14E+06 | 1.50E+04 | 76 | 11.9 | n/a |
| Virgin | LF2103 | 0.3 | 0.922 | 1.27E+06 | 1.31E+04 | 97 | 15.7 | n/a |
| Virgin | PE3020D | 0.3 | 0.927 | 1.49E+06 | 1.38E+04 | 108 | 23.2 | n/a |
| LDPE recyclate | | | | | | | | n/a |
| LDPE recyclate | PCR#1 [3] | 0.5-1.5 | 0.918-0.932 | 2.85E+05 | 1.76E+04 | 16 | 1.76 | <1.8 |
| LDPE recyclate | PCR#2 [4] | 0.5-1.0 | 0.920-0.935 | 3.77E+05 | 2.60E+05 | 27 | nd[2] | ≤2.5 |

1 n/a = not applicable
[2]nd = not determined
[3] ~25-30% LDPE (balance primarily as LLDPE)
[4] ~40% LDPE (balance as LLDPE)

EXAMPLES

Example 1

Three virgin LDPE resins were compounded with two different sources and proportions of post-consumer recycled LDPE/LLDPE. The materials were compounded at a Specific Energy Input of 0.027 kW-hr/lb (0.059 kW-hr/kg) with a melt temperature of 410° F. on a ZSE 18 twin screw extruder manufactured by Leistritz Extrusionstechnik GmbH. This compounding run did not include the use of a screenpack. Films were produced from the resulting blends by extrusion on a cast film line manufactured by Collin Lab & Pilot Solutions GmbH with a single stage 3:1 compression ratio 25 mm diameter single screw extruder and a 150 mm wide slot die with a 20 mil die gap, equipped with an FSA-100 camera-based defect counting instrument produced by Optical Control Systems GmbH and the gel (defect) levels measured. Two (2) mil thick films were produced using a melt temperature of 200° C., a chill roll temperature of 20° C., and a line speed of 4.55 meters/min. The levels of gel defects were measured using a minimum defect size of 250 microns, grey value of 169, and a mean filter size of 50.

Table 2 below shows the results.

TABLE 2

| Gel Defect Area for Different Virgin LDPE/PCR-PE blends | | | | | | |
|---|---|---|---|---|---|---|
| LDPE | LDPE Melt Index | LDPE Density | Measured Gel Level ($mm^2$ defect area/$m^2$ film area) | | | |
| Grade | (g/10 min) | (g/cc) | 25% PCR # 1 | 25% PCR #2 | 45% PCR # 1 | 45% PCR #2 |
| NA321 | 2.0 | 0.922 | 2360 | 5950 | 3280 | 14420 |
| L3035 | 0.4 | 0.929 | 2850 | 7340 | 3570 | 12200 |
| LF2103 | 0.3 | 0.922 | 710 | 4550 | 1220 | 5400 |

Regardless of the proportion or source of PCR-LDPE, use of LF2103 to make the blend consistently results in a lower level of defects, often by more than 60%. Without being bound by any theory, the data from this experiment suggest that higher viscosity (e.g. lower melt index) of the virgin LDPE contributes to the reduced gel levels; the higher viscosity may result in more energy intensive mixing during the compounding process.

Example 2

In a second experiment, a different batch of LF2103 was compared to PE3020D using second sample of PCR #1. PE 3020D has a similar melt index to LF2103. This second experiment also involved a different compounding machine and improved melt filtration using a 200-mesh screenpack. The materials were compounded at a Specific Energy Input of 0.031 kW-hr/lb (0.068 kW-hr/kg) with a melt temperature of 417° F. on a ZSK 26 twin screw extruder manufactured by Coperion GmbH. Gel Defects were measured as in Example 1. Results are shown in Table 3 below:

TABLE 3

| Gel Defect Area for Different Virgin LDPE/PCR#1 blends | | | |
|---|---|---|---|
| LDPE Grade | LDPE Melt Index (g/10 min) | LDPE Density (g/cc) | Measured Gel Level ($mm^2$ defect area/$m^2$ film area) 45% PCR # 1 |
| PE 3020D | 0.3 | 0.927 | 570 |
| LF2103 | 0.3 | 0.922 | 500 |

The results of this experiment also demonstrated a lower defect level when LF2103 was used, though the reduction was not as much as demonstrated in the first experiment.

Table 1 shows that the ratio of low frequency viscosity to high frequency viscosity for LF2103 is lower than for PE3020D, indicating that the viscosity of LF2103 decreases less rapidly than PE3020D with increasing shear (less shear thinning). This is the simplest measure. Interestingly, NA321 has a much lower ratio (e.g. even less shear thinning), suggesting that high viscosity of the virgin LDPE (and likely of the PCR-LDPE) contributes more to reduction of gel defects than reduced shear thinning.

Rheological Dispersity Ratio (RDR) is described in "New Measures of Polydispersity from Rheological Data on Polymer Melts." According to this paper, RDR value is an indicator of molecular weight breadth and is an index of sensitivity of viscosity to shear force. In this case, Both of RDR and the ratio of Eta025 to Eta 100 for LF2103 are higher than for L3035 or NA321, again indicating reduced viscosity sensitivity to shear.

This conclusion that the level of gel defects in a film, especially one cast from a blend of virgin LDPE and PCR LDPE/LLPE, can be reduced so significantly by use of a low MI2, high Eta025, and low Eta025/Eta100 ratio (or low RDR) virgin LDPE is a result not expected by one of skill in the art at present. Thus, without being bound by any theory, it appears that use of a virgin LDPE having high viscosity at low shear and low sensitivity to shear thinning is important to producing a film comprising a high percentage of PCR-LDPE and having a low amount of gel defects. Further, though both are important, it appears that the property of high viscosity at low shear makes a larger contribution to the decrease in gel defects than that of low sensitivity to shear thinning.

LF2103 is known to be less shear-thinning than many other LDPE grades, even those with similar melt indices such as PE 3020D. Lower shear-thinning fluids require more energy intensive mixing during the compounding step and use of a low shear-thinning virgin polymer may result in improved dispersion of contaminates and reduction in measured gel levels.

Example 3

In a third experiment, LF2103 was compounded with 45% PCR #1 and 45% PCR #2 using a ZSK 26 twin screw extruder manufactured by Coperion GmbH. In comparison, a sample of L3035 was also compounded with 45% PCR #1 and 45% PCR #2. The materials were compounded at a Specific Energy Input of 0.028 kW-hr/lb (0.062 kW-hr/kg) with a melt temperature of 439° F. (226° C.). This third experiment also involved improved melt filtration using a 200-mesh screenpack. These compounded blends were used to prepare films by extrusion on a cast film line manufactured by Collin Lab & Pilot Solutions GmbH with a single stage 3:1 compression ratio 25 mm diameter single screw extruder and a 150 mm wide slot die with a 20 mil die gap, equipped with a FSA-100 camera based defect counting instrument produced by Optical Control Systems GmbH and the gel (defect) levels measured. Two (2) mil thick films were produced using a melt temperature of 200° C., a chill roll temperature of 20° C., and a line speed of 4.90 meters/min. The levels of gel defects were measured using a minimum defect size of 250 microns, grey value of 169 and a mean filter size of 50.

Gel defects per $m^2$ for each film are shown in FIG. 1.

Example 4

Figure 2A:
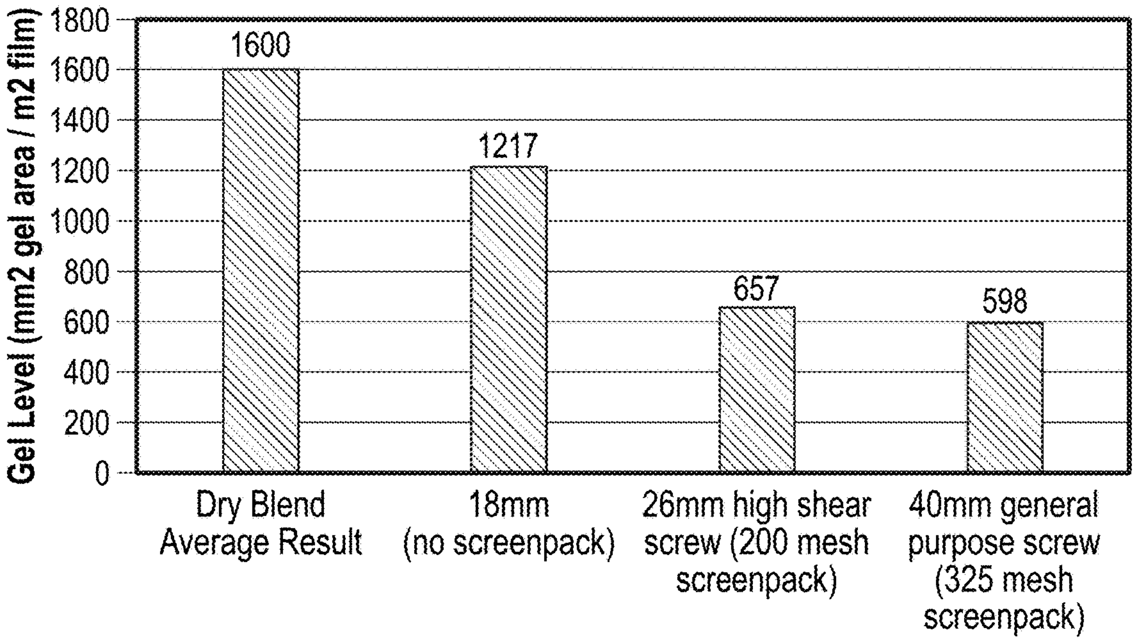
FIG. 2A shows the average number of defects per $m^2$ for films produced from a mixture of 55 wt. % LF2103 virgin LDPE and 45 wt. % PCR #1, and then either dry blended or compounded by a screw extruder of a certain size, and with or without a screenpack, as in Example 4. The size distribution of defects is also shown in FIG. 2B.
Figure 2B:
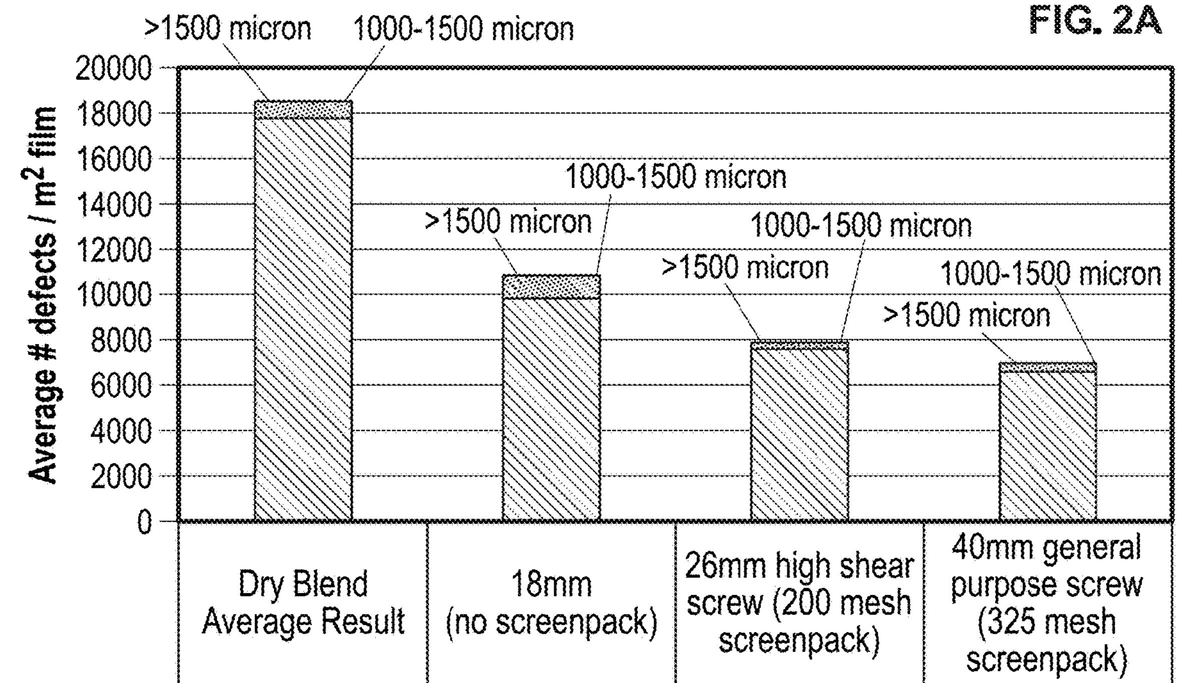

In a fourth experiment, a mixture of 55% LF2103 virgin LDPE and 45% PCR #1 was either dry blended, or compounded in one of a variety of screw extruders, and then the resulting blends were used to prepare films by extrusion on a cast film line manufactured by Collin Lab & Pilot Solutions GmbH with a single stage 3:1 compression ratio 25 mm diameter single screw extruder and a 150 mm wide slot die with a 20 mil die gap, equipped with a FSA-100 camera-based defect counting instrument produced by Optical Control Systems GmbH and the gel (defect) levels measured. Two (2) mil thick films were produced using a melt temperature of 200° C., a chill roll temperature of 20° C., and a line speed of 4.55 meters/min. The levels of gel defects were measured using a minimum defect size of 250 microns, grey value of 169, mean filter size of 50, and exposure time of 0.039 milliseconds. FIG. 2A shows the average number of gel defects per $m^2$ for each of the preparations. FIG. 2B shows the distribution of the defects vs. size of the defect. "18 mm" is a 18 mm diameter ZSE 18 twin-screw extruder manufactured by Leistritz Extrusionstechnik GmbH, operated at a Specific Energy Input of 0.027 kW-hr/lb (0.060 kW-hr/kg) with a melt temperature of 410° F. (210° C.). "26 mm high shear screw" is a 26 mm diameter ZSK 26 twin-screw extruder manufactured by Coperion GmbH run at a melt temperature of 417° F. and a Specific Energy Input of 0.031 kW-hr/lb (0.068 kW-hr/kg). A 200 mesh screenpack is included at the outlet of the extruder to filter the blend before film formation. "40 mm general purpose screw" is a 40 mm ZSK 40 twin-screw extruder manufactured by Coperion GmbH and run at a Specific Energy Input of 0.10 KW-hr/lb (0.22 kW-hr/kg) with a melt temperature of 403° F. (206° C.). A 325 mesh screenpack is included at the outlet of the extruder to filter the blend before film formation.

A control sample comprised of a pellet ("dry") blend of the same components was also extruded on the same cast film line and the gels were measured.

The results are shown in FIG. 2.

From the data, it is apparent that the two equipment components of the blending are important to reduced gel levels: 1) the increased mixing that a twin-screw mixing extruder applies to the polymer (vs. the single-screw on the cast film line for the dry blend) and 2) the melt filtration resulting from the screenpack. The energy intensity of the mixing likely plays a role, but there is some marginal improvement when moving from the 26 mm compounder (equipped with a screw designed to maximize the shear applied to the polymer) to the 40 mm compounder (equipped with a general purpose, less shear intensive screw design). Based on screw design, the 40 mm compounder would be expected to have higher gel values if the amount of gel defects is attributable solely to equipment design. Furthermore, the 18 mm twin-screw extruder shows a reduction in gel level vs. the dry blend (cast film line only), but not to the extent that either of the larger extruders show when combined with the screenpack.

Example 5

In a fifth experiment, the quantity of defects was compared among films formed from 100% LF2103 virgin LDPE, a compounded blend of 55% LF2103 and 45% PCR #1 and 100% PCR #1. A different batch of PCR #1 was used in this experiment than the previous examples. The compounded blend was prepared on a 40 mm ZSK 40 twin-screw extruder manufactured by Coperion GmbH and run at a Specific Energy Input of 0.10 kW-hr/lb (0.22 kW-hr/kg) with a melt temperature of 403° F. (206° C.). Films were prepared using the cast film line manufactured by Collin Lab & Pilot Solutions GmbH equipped with the OCS FSA-100 system described in previous examples. Two (2) mil thick films were produced using a melt temperature of 164° C., a chill roll temperature of 20° C., and a line speed of 4.8 meters/min. The levels of gel defects were measured using a minimum defect size of 250 microns, grey value of 169 and mean filter size of 50. The gel results are shown in Table 4 below:

TABLE 4

| Comparison of defect area with predicted defect area | | |
|---|---|---|
| Resin | Total Defect Area (ppm) | Predicted Total Defect Area via Linear Proportion |
| 100% LF2103 | 13.7 | 13.7 |
| 45% PCR #1/55% LF2103 | 597.9 | 5269 |
| 100% PCR #1 | 11692 | 11692 |

For comparison, a calculation of an expected defect level if the gel (defect) reduction was simply due to dilution is included in Table 3, e.g. if the gel level was reduced according to a linearly proportional relationship calculation such as Defect Area of blend=(% PCR×PCR Defect Level)+(% Virgin LDPE×Virgin LDPE Defect Level). From the results, it can be seen that the compounding process results in a significantly lower gel level than would be predicted by a proportional relationship. This indicates that there is some unexpected synergy between the properties of the compounded resins and the compounding process in the lowering of the amount of the gel defects.

Example 6

Figure 3:
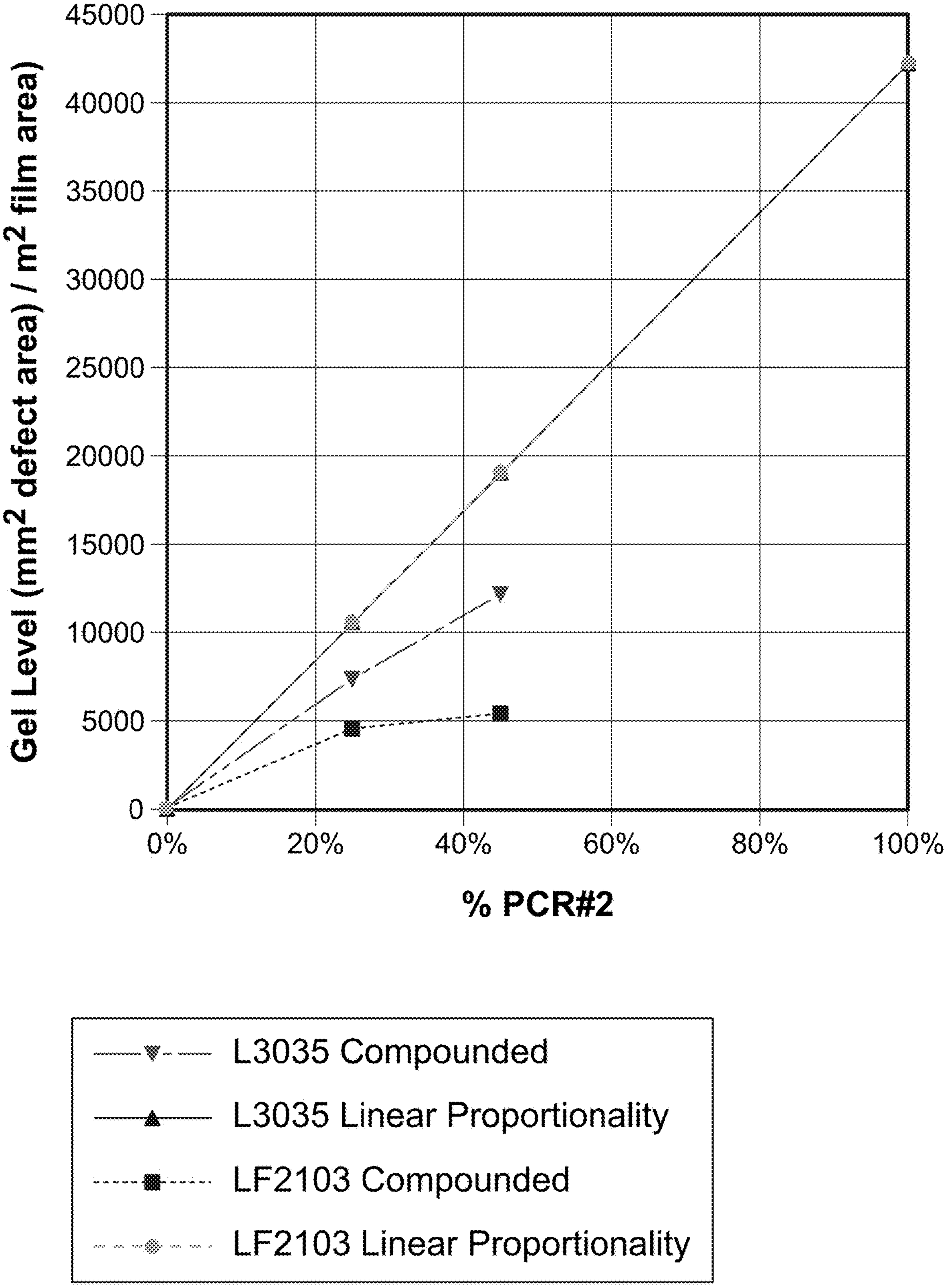
FIG. 3 is a plot of gel level as a function of proportion of PCR #2 in a blend with two different virgin LDPEs. A predicted function as a linear combination of the two ingredients is compared to actual measured values for up to 50 wt. % PCR #2.

In a sixth experiment, the quantity of defects was compared among films formed from 100 wt. % of virgin L3035 or LF2103, the compounded blends of each containing PCR #2 as described in Example 1, and 100 wt. % PCR #2. The films were prepared on the cast film line equipped with the OCS FSA-100 system described in previous examples. Two (2) mil thick films were produced using a melt temperature of 200° C., a chill roll temperature of 20° C., and a line speed of 4.6 meters/min. The levels of gel defects were measured using a minimum defect size of 250 microns, grey value of 169 and a mean filter size of 50. The gel results are shown in Table 5 below and plotted as FIG. 3.

TABLE 5

| Gel (Defect) Level for Compounded Blends vs. Linear Proportionality Calculation | | | | |
|---|---|---|---|---|
| % PCR #2 | L3035 Compounded | L3035 Linear Proportionality | LF2103 Compounded | LF2103 Linear Proportionality |
| 0% | 20 | 20 | 19 | 19 |
| 25% | 7341 | 10574 | 4545 | 10573 |
| 45% | 12127 | 19017 | 5398 | 19017 |
| 100% | — | 42236 | — | 42236 |

From the data, it is apparent that through the use of a compounding process in conjunction with the use of the correct virgin LDPE grade a significant reduction in defect level can be achieved beyond what would be predicted via a simple linear proportionality relationship.

Example 7

Dry (pellet) blends were prepared, and the quantity of defects was compared among films produced via the blown film process. The blends were comprised of either of two virgin LDPE grades (L3035 or LF2103) and either 25 wt. % or 45 wt. % of LDPE recyclate PCR #1. Two (2) mil thick films were prepared on a Davis Standard blown film line with a 24:1 Length: Diameter single screw extruder equipped with a 2-inch barrier Maddock screw and a 60 mesh screenpack. The films were produced at 60 lbs./hr. (27 kg/hr) on a 4-inch (10 cm) monolayer blown film die with a 60 mil die gap using a dual lip air ring with a blow up ratio (BUR) of 2.5:1, melt temperature of 380° F. (193° C.), and a line speed of 9 meters/min. Defect levels in the films were measured using an OCS FSA-100 system with the following settings: minimum defect size of 250 microns, grey value of 169 and a mean filter size of 50. The results are shown in Table 6 below.

TABLE 6

| Gel Defect Level for Blends of Different Virgin LDPE with PCR#1 | | | | |
|---|---|---|---|---|
| LDPE | LDPE Melt Index | LDPE Density | Measured Gel Level (mm$^2$ defect area/m$^2$ film) | |
| Grade | (g/10 min) | (g/cc) | 25% PCR # 1 | 45% PCR # 1 |
| L3035 | 0.4 | 0.929 | 4713 | 5837 |
| LF2103 | 0.3 | 0.922 | 1591 | 2327 |

The results of this experiment further illustrate that use of LF2103 as the virgin LDPE component in blends with LDPE recyclates results in significant reductions in film defect levels, often by more than 60%. Furthermore, when compared to the results shown in Example 4 (FIG. 2) these results indicate that a single screw extruder cannot achieve the reduction in gel levels that results from the twin-screw compounding whether the cast film or blown film process is used to produce the films.

Example 8

The compounded pellet, denoted as GA305GA305RX01, comprising 55 wt. % LDPE and 45wt. % PCR #1 was substituted for virgin L3035 in the production of a layered film, composed as in Table 5 below. GA GA305RX01 is a compounded pellet of virgin LDPE having 45 wt. % PCR-LDPE, with some minor LLDPE content.

TABLE 7

| Composition of Control and Experimental Film Samples | | |
|---|---|---|
| Layer | Control Sample | Experimental Sample |
| skins | L3035, mLLDPE | L3035, mLLDPE |
| core | GP HDPE, L3035 | GP HDPE, GGA305RX01* |
| % PCR in total film volume | 0% | 20-25% |

*GA305RX01 is a compounded blend of 55% virgin LDPE and 45% PCR#1

Figure 5:
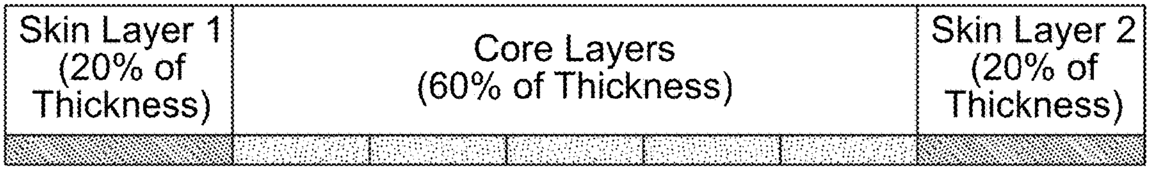
FIG. 5 shows a cross-section of the layered film produced in Example 8.

2.0 mil films were formed from the control and experimental samples on a blown film line manufactured by Collin Lab & Pilot Solutions GmbH with 7 individual extruders, each of 25:1 Length: Diameter ratio. The extruders feeding the outer 4 layers of the film have 25 mm diameters while the inner 3 layers of the film are fed by extruders with 20 mm diameters. The film line is equipped with a 60 mm diameter die and a dual lip air ring. 3-layer films were produced in both the control and experimental samples by feeding the two outermost (skin) layers a blend of 5 wt. % L3035 and 95 wt. % mLLDPE while the five (encapsulated) inner layers were all composed of either the blend of 75 wt. % L3035 and 25 wt. % of a HDPE general purpose grade or 75 wt. % GA305RX01 and 25 wt. % of the same HDPE general purpose grade. These skin layers were each 20% by thickness of the film structure. FIG. 5 shows a cross-section of the film structure. The blown film die opening was set at 2 mm, the films were produced with a 2.5:1 Blowup Ratio, and each extruder was operated at melt temperature of 380° F. (193° C.). The physical properties of the films were tested according to the relevant ASTM testing methods:

Shrink, Machine Direction (MD) and Transverse Direction (TD)—ASTM D2732

Haze—ASTM D1003

Gloss—ASTM D2457

Tear strength, MD and TD—ASTM D1922

Modulus, MD and TD—ASTM D882

Dart Drop—ASTM D1709

Figure 4:
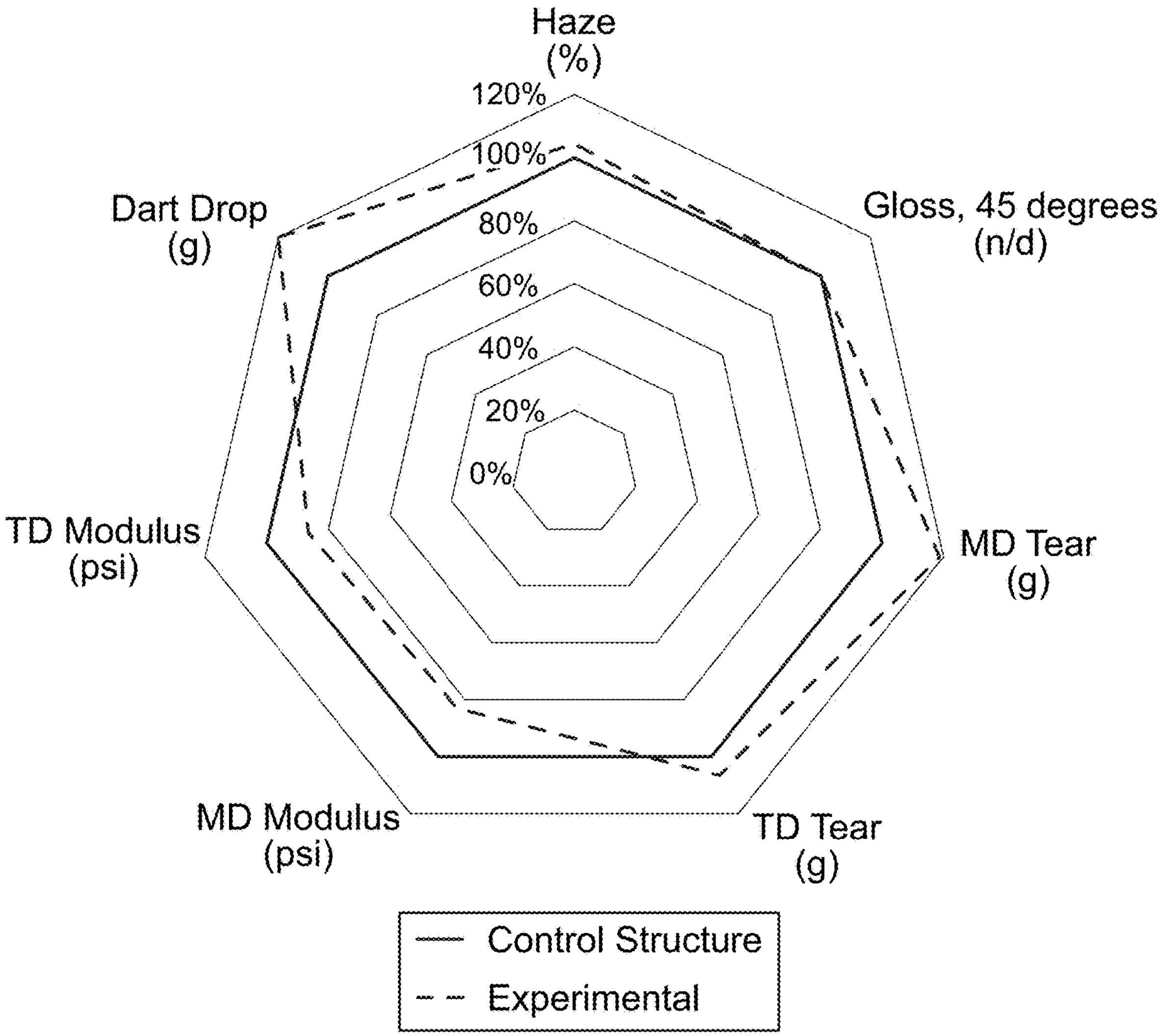
FIG. 4 shows a plot of the change in physical characteristics of the film of Example 5 having the core layer using the GA305RX01 compounded pellet instead of the virgin LDPE compared to the characteristics of the film utilizing the virgin LDPE in the core layer.

Results are shown in FIG. 4 and Table 8 below.

TABLE 8

Shrink properties of films

| Property | Control Sample | Experimental Sample |
|---|---|---|
| Shrink @ 135° C. (MD) | 79% | 73% |
| Shrink @ 135° C. (TD) | 12% | 7% |
| % PCR in total film volume | 0% | 20% |

Taken together these results show that the substitution of the single-pellet, high PCR content resin GA305RX01 for the virgin LDPE in the core provides a layered film with similar optical properties, increased tear resistance, increased dart drop tolerance, slightly reduced shrink and a slightly reduced modulus.

Enumerated Examples (EEs)

EE1: A polymer blend comprising:

a) a virgin low density polyethylene (LDPE) component in an amount of from 35 wt. % to 75 wt. %, the virgin LDPE component having:
  (i) a Melt Index at 2.16 kg (MI2) by ASTM D1238 of from 0.15-2.5 g/10 min;
  (ii) an Eta025 of from $0.25\times10^6$ to $2.3\times10^6$ poise at 150° C.;
  (iii) an Eta100 of from $0.7\times10^4$ to $1.7\times10^4$ poise at 150° C.;

b) a post-consumer low density polyethylene recyclate (PCR-LDPE) component in an amount from 25 wt. % to 65 wt. % of the total weight of the blend, the PCR component having:
  (i) a MI2 by ASTM D1238 of from 0.5-3.0 g/10 min;
  (ii) an Eta025 of from $2.5\times10^5$ to $8.0\times10^5$ poise at 150° C.;
  (iii) an Eta100 of from $1.6\times10^4$ to $3.0\times10^4$ poise at 150° C.;

wherein weight percentages of the virgin LDPE and PCR-LDPE components are based on the total weight of the virgin LDPE and the PCR-LDPE components.

EE2: The polymer blend of EE1, wherein the virgin LDPE component has a Rheological Dispersity Ratio (RDR) of from 10 to 25.

EE3: The polymer blend of EE11 or EE2, wherein the PCR-LDPE component has a RDR of from 1.00 to 2.50.

EE4: The polymer blend of any one of EEs1-3, wherein the density of the virgin LDPE component is from 0.900 to 0.934.

EE5: The polymer blend of any one of EEs1-4, wherein the density of the PCR-LDPE component is from 0.910 to 0.960.

EE6: The polymer blend of any one of EEs1-5, wherein the virgin LDPE has a ratio of Eta025 to Eta100 of from 15 to 150.

EE7: The polymer blend of any one of EEs1-6, that is compounded in a twin-screw extruder with a specific energy input from 0.02 to 0.26 kW-hr/lb (0.044 to 0.57 kW-hr/kg).

EE8: The polymer blend of EE7, wherein the twin-screw extruder includes a screenpack at the outlet of the extruder.

EE9: A polymer film comprising the blend of any one of EEs 1-8.

EE10: The polymer film of EE9, having a level of gel defects of ≤1600 $mm^2/m^2$.

EE11: The polymer film of EE9, having a level of gel defects of ≤660 $mm^2/m^2$.

EE12: A method for reducing gel defects in a polymer film product comprising:

a) blending a virgin low density polyethylene (LDPE) component in an amount of from 35 wt. % to 75 wt. %, the virgin LDPE component having:
  (i) a MI2 by ASTM D1238 of from 0.15-2.5 g/10 min;
  (ii) an Eta025 of from $0.25\times10^6$ to $2.3\times10^6$ poise at 150° C.;
  (iii) an Eta100 of from $0.7\times10^4$ to $1.70\times10^4$ poise at 150° C.;

and a post-consumer recyclate LDPE (PCR-LDPE) component in an amount from 25 wt. % to 65 wt. %, the PCR-LDPE component having:
  (i) a MI2 by ASTM D1238 of from 0.5-3.0 g/10 min;
  (ii) an Eta025 of from $2.5\times10^5$ to $8.0\times10^5$ poise at 150° C.;
  (iii) an Eta100 of from $1.6\times10^4$ to $3.0\times10^4$ poise at 150° C.; and wherein weight percentages of the virgin LDPE and PCR-LDPE components are based on the total weight of the virgin LDPE and the PCR-LDPE components;

to obtain a film resin; and b) forming a film from the film resin by a film extrusion or film blowing process.

EE13: The method of EE12, wherein the virgin LDPE component has a RDR of from 10.0 to 25.0.

EE14: The method of EE12 or EE13, wherein the PCR-LDPE component has a RDR of from 1.00 to 2.50.

EE15: The method of any one of EEs12-14, wherein the blending is performed in a twin-screw compounder with a specific energy input from 0.02 to 0.26 kW-hr/lb (0.044 to 0.57 kW-hr/kg) and a melt temperature between 370° F. (188° C.) and 460° F. (238° C.).

EE16: A film prepared using the method of any one of EEs12-15.

EE17: The polymer film of EE16, having a level of gel defects of ≤1600 $mm^2/m^2$.

EE18: The polymer film of EE16, having a level of gel defects of ≤660 $mm^2/m^2$.

EE19: The polymer film of EE 16, having:

a 1% secant modulus in the machine direction of from 25,000 to 55,000 psi and in the transverse direction of from 25,000 to 55,000 psi; and shrink at 135° C. in the machine direction of from 60 to 85% and in the transverse direction of from 5 to 50%.

EE20: A method for preparing a solid polymer blend comprising mixing:

a) a virgin low density polyethylene (LDPE) component in an amount of from 35 wt. % to 75 wt. % of the, the virgin LDPE component having:
  (i) a Melt Index at 2.16 kg (MI2) by ASTM D1238 of from 0.15-2.5 g/10 min;

(ii) an Eta025 of from $0.7\times10^6$ to $2.3\times10^6$ poise at 150° C.;

(iii) an Eta100 of from $0.9\times10^4$ to $1.50\times10^4$ poise at 150° C.;

b) a post-consumer low density polyethylene recyclate (PCR-LDPE) component in an amount from 25 wt. % to 65 wt. % of the total weight of the blend, the PCR component having:

(i) a MI2 by ASTM D1238 of from 0.5-3.0 g/10 min;

(ii) an Eta025 of from $2.5\times10^5$ to $8.0\times10^5$ poise at 150° C.;

(iii) an Eta100 of from $1.6\times10^4$ to $3.0\times10^4$ poise at 150° C.;

wherein weight percentages of the virgin LDPE and PCR-LDPE components are based on the total weight of the virgin LDPE and the PCR-LDPE components;

in a twin-screw extruder generating a specific energy input of at least 0.02 kW-hr/lb (0.044 kW-hr/kg), at a temperature of from 370° F. (188° C.) to 460° F. (238° C.) to form a polymer blend; and extruding and pelletizing the polymer blend, or extruding the polymer blend directly into an apparatus for forming a film.

EE21: The method of EE20, wherein the virgin LDPE component has a Rheological Dispersity Ratio (RDR) of from 1.00 to 2.50.

EE22: The method of EE20 or EE21, wherein the PCR-LDPE component has a RDR of from 1.00 to 2.50.

EE23: The method of any one of EEs20-22, wherein the virgin LDPE has a ratio of Eta025 to Eta100 of from 25 to 115.

EE24: The method of any one of EEs20-23, wherein the density of the virgin LDPE component is from 0.900 to 0.934.

EE25: The method of any one of EEs20-24, wherein the density of the PCR-LDPE component is from 0.910 to 0.950.

EE26: The method of any one of EEs 20-25, wherein the twin-screw extruder includes a screenpack.

EE26: A method for preparing a solid polymer blend comprising:

a) adding a virgin LDPE component and a PCR-LDPE component to an extruder;

b) mixing the virgin LDPE and PCR-LDPE under compounding conditions to form a polymer blend product; and c) withdrawing the polymer blend product from the extruder.

The above examples are included to demonstrate embodiments of the appended claims using the above described compositions. As shown, the presently disclosed compositions have reduced amounts of gels (e.g. less than 1600 $mm^2/m^2$), which improves the processability and aesthetics of the final packaging.

The invention claimed is:

1. A polymer blend comprising:

a) a virgin low density polyethylene (LDPE) component in an amount of from 35 wt. % to 75 wt. %, the virgin LDPE component having:

(i) a Melt Index at 2.16 kg (MI2) by ASTM D1238 of from 0.15-2.5 g/10 min;

(ii) an Eta025 of from $0.25\times10^6$ to $2.3\times10^6$ poise at 150° C.;

(iii) an Eta100 of from $0.7\times10^4$ to $1.7\times10^4$ poise at 150° C.; and b) a post-consumer low density polyethylene recyclate (PCR-LDPE) component in an amount from 25 wt. % to 65 wt. % of the total weight of the blend, the PCR component having:

(i) a MI2 by ASTM D1238 of from 0.5-3.0 g/10 min;

(ii) an Eta025 of from $2.5\times10^5$ to $8.0\times10^5$ poise at 150° C.;

(iii) an Eta100 of from $1.6\times10^4$ to $3.0\times10^4$ poise at 150° C.;

wherein weight percentages of the virgin LDPE and PCR-LDPE components are based on the total weight of the virgin LDPE and the PCR-LDPE components.

2. The polymer blend of claim 1, wherein the virgin LDPE component has a Rheological Dispersity Ratio (RDR) of from 10 to 25.

3. The polymer blend of claim 2, wherein the PCR-LDPE component has a RDR of from 1.00 to 2.50.

4. The polymer blend of claim 1, wherein the density of the virgin LDPE component is from 0.900 to 0.934.

5. The polymer blend of claim 4, wherein the density of the PCR-LDPE component is from 0.910 to 0.960.

6. The polymer blend of claim 1, wherein the virgin LDPE has a ratio of Eta025 to Eta100 of from 15 to 150.

7. The polymer blend of claim 1, that is compounded in a twin-screw extruder with a specific energy input from 0.02 to 0.26 kW-hr/lb (0.044 to 0.57 kW-hr/kg).

8. The polymer blend of claim 7, wherein the twin-screw extruder includes a screenpack at the outlet of the extruder.

9. A polymer film comprising the blend of claim 1.

10. The polymer film of claim 9, having a level of gel defects of ≤1600 $mm^2/m^2$.

11. The polymer film of claim 9, having a level of gel defects of ≤660 $mm^2/m^2$.

12. A method for reducing gel defects in a polymer film product comprising:

a) blending a virgin low density polyethylene (LDPE) component in an amount of from 35 wt. % to 75 wt. %, the virgin LDPE component having:

(i) a MI2 by ASTM D1238 of from 0.15-2.5 g/10 min;

(ii) an Eta025 of from $0.25\times10^6$ to $2.3\times10^6$ poise at 150° C.;

(iii) an Eta100 of from $0.7\times10^4$ to $1.70\times10^4$ poise at 150° C.;

and a post-consumer recyclate LDPE (PCR-LDPE) component in an amount from 25 wt. % to 65 wt. %, the PCR-LDPE component having:

(i) a MI2 by ASTM D1238 of from 0.5-3.0 g/10 min;

(ii) an Eta025 of from $2.5\times10^5$ to $8.0\times10^5$ poise at 150° C.;

(iii) an Eta100 of from $1.6\times10^4$ to $3.0\times10^4$ poise at 150° C.;

wherein weight percentages of the virgin LDPE and PCR-LDPE components are based on the total weight of the virgin LDPE and the PCR-LDPE components;

to obtain a film resin; and b) forming a film from the film resin by a film extrusion or film blowing process.

13. The method of claim 12, wherein the virgin LDPE component has a RDR of from 10.0 to 25.0.

14. The method of claim 13, wherein the PCR-LDPE component has a RDR of from 1.00 to 2.50.

15. The method of claim 12, wherein the blending is performed in a twin-screw compounder with a specific energy input from 0.02 to 0.26 kW-hr/lb (0.044 to 0.57 kW-hr/kg) and a melt temperature between 370° F. (188° C.) and 460° F. (238° C.).

16. A film prepared using the method of claim 12.

17. The polymer film of claim 16, having a level of gel defects of ≤1600 $mm^2/m^2$.

18. The polymer film of claim 16, having a level of gel defects of ≤660 $mm^2/m^2$.

19. The polymer film of claim 16, having:

a 1% secant modulus in the machine direction of from 25,000 to 55,000 psi and in the transverse direction of from 25,000 to 55,000 psi; and shrink at 135° C. in the machine direction of from 60 to 85% and in the transverse direction of from 5 to 50%.

20. A method for preparing a solid polymer blend comprising mixing:

a) a virgin low density polyethylene (LDPE) component in an amount of from 35 wt. % to 75 wt. % of the, the virgin LDPE component having:

(i) a Melt Index at 2.16 kg (MI2) by ASTM D1238 of from 0.15-2.5 g/10 min;

(ii) an Eta025 of from $0.7\times10^6$ to $2.3\times10^6$ poise at 150° C.;

(iii) an Eta100 of from $0.9\times10^4$ to $1.50\times10^4$ poise at 150° C.; and b) a post-consumer low density polyethylene recyclate (PCR LDPE) component in an amount from 25 wt. % to 65 wt. % of the total weight of the blend, the PCR component having:

(i) a MI2 by ASTM D1238 of from 0.5-3.0 g/10 min;

(ii) an Eta025 of from $2.5\times10^5$ to $8.0\times10^5$ poise at 150° C.;

(iii) an Eta100 of from $1.6\times10^4$ to $3.0\times10^4$ poise at 150° C.;

wherein weight percentages of the virgin LDPE and PCR-LDPE components are based on the total weight of the virgin LDPE and the PCR-LDPE components;

in a twin-screw extruder generating a specific energy input of at least 0.02 kW-hr/lb (0.044 kW-hr/kg), at a temperature of from 370° F. (188° C.) to 460° F. (238° C.) to form a polymer blend; and extruding and pelletizing the polymer blend, or extruding the polymer blend directly into an apparatus for forming a film.

* * * * *